(12) United States Patent
Nojiri et al.

(10) Patent No.: US 12,091,141 B2
(45) Date of Patent: Sep. 17, 2024

(54) SYSTEM FOR DETERMINING AUTOMATIC DOCKING IS COMPLETE BY COLLISION

(71) Applicant: Honda Motor Co., Ltd., Tokyo (JP)

(72) Inventors: Daisuke Nojiri, Saitama (JP); Ryota Hisada, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 217 days.

(21) Appl. No.: 17/964,008

(22) Filed: Oct. 11, 2022

(65) Prior Publication Data

US 2024/0116608 A1  Apr. 11, 2024

(51) Int. Cl.
*G05D 1/00* (2024.01)
*B63B 79/10* (2020.01)
*B63C 1/04* (2006.01)
*B63H 25/04* (2006.01)

(52) U.S. Cl.
CPC ............ *B63C 1/04* (2013.01); *B63B 79/10* (2020.01); *B63H 25/04* (2013.01); *G05D 1/0206* (2013.01)

(58) Field of Classification Search
CPC ........... B63C 1/04; B63B 79/10; B63H 25/04; G05D 1/0206; G05D 1/241; G05D 2105/22; G05D 1/661; G05D 1/81; G05D 2107/84; G05D 2109/34; G05D 1/00
USPC ............................................................ 701/21
See application file for complete search history.

(56) References Cited

U.S. PATENT DOCUMENTS

2016/0187883 A1\* 6/2016 Tyers ................... G05D 1/0206
  701/21
2021/0247767 A1\* 8/2021 Tyers ................... G05D 1/0206

\* cited by examiner

*Primary Examiner* — Shardul D Patel
(74) *Attorney, Agent, or Firm* — JCIPRNET (57) ABSTRACT

A system, adapted to determine that automatic docking of a boat is completed. The system including a control unit including a processor configured to switch a control mode of the control unit to an automatic docking mode; output a control signal for controlling an automatic steering of the boat when the control mode is switched to the automatic docking mode; obtain a vibration that is exerted on the boat, wherein, when the control unit is in the automatic docking mode, the control unit is configured to end the automatic docking mode when the control unit detects the vibration.

11 Claims, 6 Drawing Sheets

SYSTEM FOR DETERMINING AUTOMATIC DOCKING IS COMPLETE BY COLLISION

BACKGROUND OF THE DISCLOSURE

Technical Field

The disclosure relates to automatic docking of a boat, and more specifically relates to a system for determining that automatic docking of the boat is completed.

Related Art

Conventionally, when a boat such as a pleasure boat is automatically docked to a pier, ultrasound sonar sensors, cameras, close range sensing devices and/or the like may be disposed on the boat to perform automatic docking of the boat. For example, the sensors may be used to detect a distance from the bow of the boat to the pier to determine that automatic docking is completed. However, the addition of each sensor increases a cost burden to the user.

Therefore, a cost effective way is needed for determining that automatic docking of the boat is completed.

SUMMARY

According to an embodiment of the disclosure, a system, adapted to determine that automatic docking of a boat is completed is provided. The system includes a control unit including a processor configured to switch a control mode of the control unit to an automatic docking mode; output a control signal for controlling an automatic steering of the boat when the control mode is switched to the automatic docking mode; obtain a vibration that is exerted on the boat, wherein, when the control unit is in the automatic docking mode, the control unit is configured to end the automatic docking mode when the control unit detects the vibration.

BRIEF DESCRIPTION OF THE DRAWINGS

Embodiments will now be described, by way of example only, with reference to the accompanying drawings which are meant to be exemplary, not limiting, and wherein like elements are numbered alike in several Figures.

DESCRIPTION OF THE EMBODIMENTS

Figure 1:
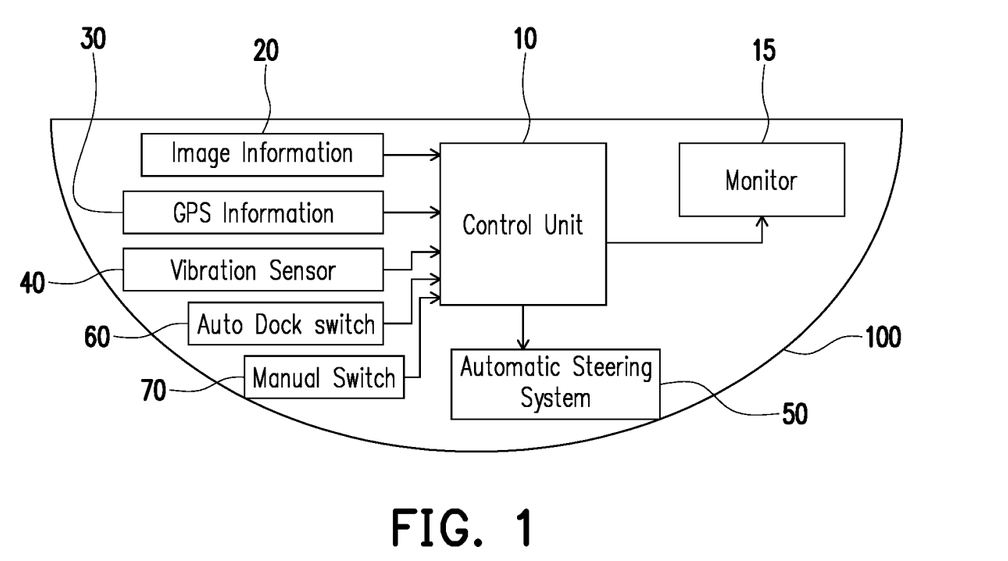
FIG. 1 is a schematic diagram illustrating a system for determining automatic docking of a boat is completed according to an embodiment of the disclosure.

FIG. 1 is a schematic diagram illustrating a system for determining automatic docking of a boat is completed according to an embodiment of the disclosure. Referring to FIG. 1, a boat 100 is provided. The boat 100 may be, for example, a water vessel, a water craft, a ship and/or the like. The boat 100 includes a propulsion system, for example, a motor for propelling the boat 100 in water. The motor may be, for example, an inboard motor, an outboard motor, a partially inboard-partially outboard motor and the like. A propeller is coupled to an output shaft of the motor. The boat 100 includes a steering system, for example, a steering wheel coupled to a rudder to steer a direction of the boat 100. The steering wheel may be coupled to the rudder by, for example, a cable or a wire or the like.

The boat 100 includes a control unit 10. The control unit 10 includes, for example, a processor and a memory. The boat 100 includes a manual driving mode and an automatic docking mode. More specifically, the boat 100 includes an automatic steering system 50 for automatically driving/steering the boat. More specifically, the boat 100 includes the automatic steering system 50 for automatically docking the boat 100 to a pier. The control unit 10 is coupled to the automatic steering system 50, wherein the control unit 10 outputs (sends/transmits) control signals to the automatic steering system 50 to automatically drive the boat 100.

In more detail, the control unit 10 controls an automatic docking of the boat 100 via the automatic steering system 50. The control unit 10 may also determine an automatic docking route of the boat 100. In the present disclosure, docking may be used interchangeably with mooring, berthing and/or the like. That is to say, the control unit 10 controls an automatic docking, mooring and/or berthing of the boat 100 via the automatic steering system 50. The control unit 10 may also determine an automatic docking route, an automatic mooring route and/or an automatic berthing route of the boat 100.

The automatic steering system 50 may include, for example, sensors, switches and actuators and/or the like. For example, an actuator may be used for automatically turning the steering wheel. In another example, an actuator may be used for controlling the throttle. A switch may be used to switch the rotating direction of the motor to move forward or reverse. A sensor may be used to detect a position of the boat 100. A sensor(s) may be used for detecting objects in a surrounding of the boat 100.

Referring to FIG. 1, a monitor 15 is disposed on the boat 10. The monitor 15 is an example of a display unit. The monitor 15 includes a display for displaying an image. The monitor 15 is coupled to the control unit 10.

Referring to FIG. 1, the control unit 10 receives image information 20 and GPS information 30. More specifically, the boat 100 includes a GPS for obtaining the GPS information 30. The GPS is an example of a Global Navigation Satellite System (GNSS).

In addition, the boat 100 includes a vibration sensor 40. The vibration sensor 40 may be, for example, an inertial measurement unit (IMU) for detecting a vibration that is exerted on the boat 100. The IMU may include, for example, a control moment gyro(s) to provide orientation information such as pitch, roll, yaw, vibration information of the boat 100, in addition to vibration information. However, the disclosure is not limited thereto. In another embodiment of the disclosure, the vibration sensor 40 may be, for example, a velocity sensor, an accelerometer, a displacement sensor and/or the like.

Figure 2:
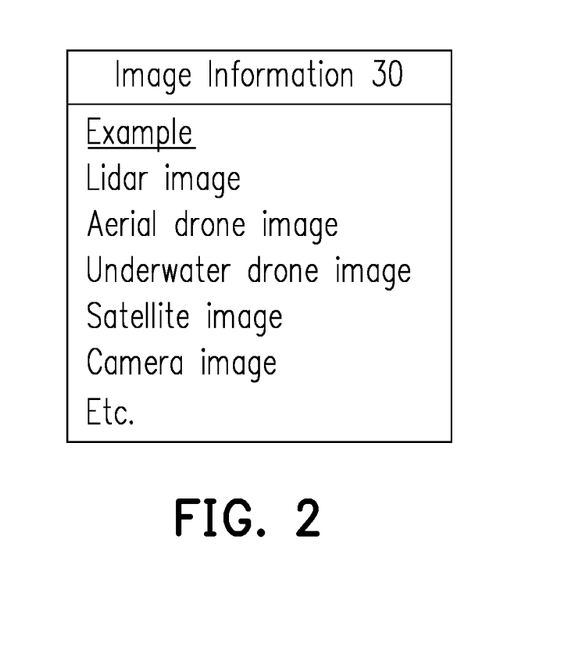
FIG. 2 is a schematic diagram illustrating some examples of image information according to an embodiment of the disclosure.

FIG. 2 is a schematic diagram illustrating some examples of image information according to an embodiment of the disclosure. Referring to FIG. 2, the image information 20 may be, for example, a lidar image, an aerial drone image, an underwater drone image, a satellite image, a camera image and/or the like. The image information 20 may be an image that is obtained in real time or an image that is stored in a memory. For example, the image information may be obtained in real time from the lidar, the underwater drone, the aerial drone, the camera on the boat 100, the camera on satellite and/or the like. In another embodiment, the image information 20 may be obtained in from an image stored in memory, such as images from the lidar, the underwater drone, the aerial drone, the camera on the boat 100, the camera on satellite and/or the like that are store in a memory. The above examples of the image information 20 are described as examples only and are not intended to limit the disclosure.

Lidar is an acronym for "light detection and ranging" or "laser imaging, detection, and ranging". The boat 100 may include the lidar for obtaining the lidar image. The boat 100 may include a camera having an image sensor for obtaining the camera image. The aerial drone image may be obtained from an aerial drone carrying a camera. The underwater drone image may be obtained from an underwater drone carrying a camera. The satellite image may be obtained from a satellite carrying a camera.

Figure 3:
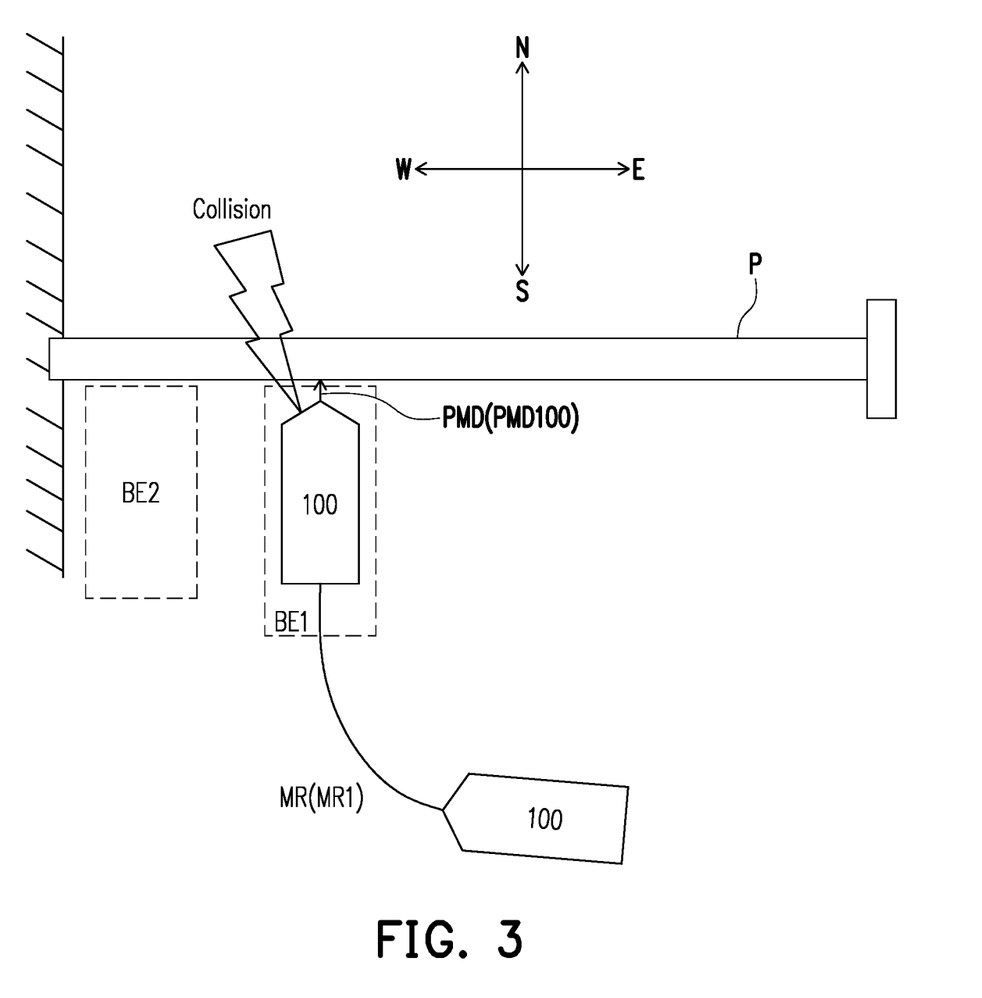
FIG. 3 is a schematic diagram illustrating an I-shape pier wherein a boat is vertically moored in a first direction according to an embodiment of the disclosure.

FIG. 3 is a schematic diagram illustrating an I-shape pier wherein a boat is vertically moored in a first direction according to an embodiment of the disclosure. Referring to FIG. 3, a pier P is provided. The shape of the pier P is not intended to limit the disclosure. For example, in another embodiment of the disclosure, the pier P may be an H-shape pier. The control unit 10 is configured to identify a berth for mooring the boat 100. More specifically, the control unit 10 may identify a first berth BE1 for mooring the boat 100 to the pier P, based on the image information 20. In addition, the control unit 10 may identify a first berth BE1 and a second berth BE2 for mooring the boat 10 to the pier P, based on the image information 20. That is to say, the control unit 10 may identify a berth that is not occupied by other boats from the image information 20. A number of the open berths for mooring the boat 100 identified by the control unit 10 is not intended to limit the disclosure.

Figure 4A:
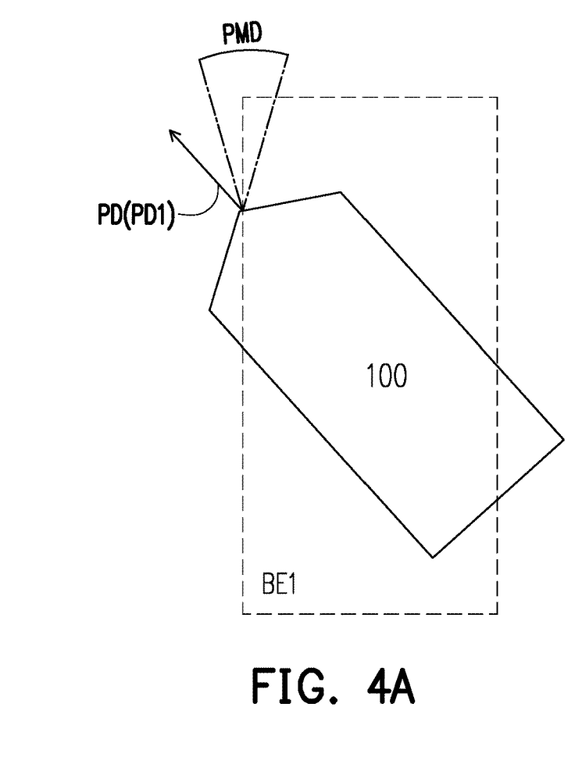
FIG. 4A-4C are schematic diagrams illustrating a comparison between a current pointing direction of a boat and a predetermined mooring direction specified for automatic docking according to an embodiment of the disclosure.

Referring to FIG. 3, the control unit 10 calculates and/or sets an automatic mooring route MR1 of the boat 100. The automatic mooring route MR1 includes a predetermined mooring direction of the boat 100. The control unit 10 calculates and/or sets a predetermined mooring direction PMD100 of the boat 100. The predetermined mooring direction PMD100 of the boat 100, and/or the automatic mooring route MR1 of the boat 100 such as shown in FIG. 4 may be displayed on the monitor 15. The mooring route MR1 is an example of a docking route. According to the mooring route MR1, the control unit 10 is configured to automatically steer the boat 100 to collide with the pier P, and the control unit 10 is configured to automatically end the automatic steering of the boat 100 when the control unit 10 detects the vibration which is originated from a collision between the boat 100 and another object (for example, another boat, the pier P).

The predetermined mooring direction PMD100 of the boat 100 may be specified, for example, in degrees from north. North may be, for example, true north or magnetic north. In another embodiment of the disclosure, the predetermined mooring direction PMD100 of the boat 100 may be specified, for example, in cardinal directions. However, the disclosure is not limited hereto. The above are examples only, and the predetermined mooring direction PMD100 of the boat 100 may be specified in other ways according to requirements.

Referring to FIG. 1, a user may switch an operation mode of the boat 100 to a manual driving mode by, for example, activating a manual switch 70. In addition the user may switch the operation mode of the boat 100 to an automatic docking mode by, for example, activating the auto dock switch 60. The auto dock switch 60 and the manual switch 70 may each be, for example, a physical push button, a touch button on an HMI (for example, the monitor 15 may be a capacitive touch screen) and/or the like. Each of the auto dock switch 60 and the manual switch 70 is an example of an input unit.

Referring to FIG. 1, when the user activates the auto dock switch 60, the control unit is configured to switch a control mode of the control unit 10 to an automatic docking mode. When the control mode is switched to the automatic docking mode, the control unit 10 is configured to output a control signal to the automatic steering system 50 for controlling an automatic steering of the boat 100. When the control mode is switched to the manual driving mode, the control unit 10 is configured to not output the control signal for controlling the automatic steering of the boat 100, or to disengage the automatic steering system 50 of the boat 100 such that the boat 100 may be steered and/or controlled manually by the user.

Referring to FIG. 3, when the control mode of the control unit 10 is switched to the automatic docking mode via the auto dock switch 60, the control unit 10 is configured to output the control signal to the automatic steering system 50 to control an automatic steering of the boat 100 in accordance to the automatic mooring route MR1 calculated and/or set by the control unit 10.

Referring to FIG. 3, when the control unit 10 is in the automatic docking mode, the control unit 10 is configured to end the automatic docking mode when the control unit 10 detects a vibration via the vibration sensor 40. In more detail, in the automatic docking mode, the control unit 10 is configured to steer the boat 100 to collide with the pier P, and the control unit 10 is configured to end the automatic docking mode when the control unit 10 detects the vibration which is originated from a collision between the boat 100 and the pier P. In the present disclosure, the pier P is an example of a dock.

In an embodiment of the disclosure, when the boat 100 is to be moored, the boat 100 may be steered close to the pier P, wherein a passenger of the boat 100 may disembark onto the pier P and then pull the boat 100 towards the pier P via a rope, such that the boat 100 collides with the pier P. The control unit 10 may end the automatic docking mode when the control unit 10 detects the vibration of the collision between the boat 100 and the pier P.

In an embodiment of the disclosure, the control unit 10 is configured to end the automatic docking mode by stopping the output of the control signal for controlling the automatic steering of the boat 100. In another embodiment of the disclosure, the control unit 10 is configured to end the automatic docking mode by not outputting the control signal for controlling the automatic steering of the boat 100. In another embodiment of the disclosure, the control unit is configured to end the automatic docking mode by outputting a control signal to the automatic steering system 50 for stopping the automatic steering of the boat 100. In another embodiment of the disclosure, the control unit 10 is configured to end the automatic docking mode by disengaging the automatic steering system 50 of the boat 100 such that the boat 100 may be steered and/or controlled manually by the user. In another embodiment of the disclosure, the control unit is configured to end the automatic docking mode by switching the control mode of the control unit 10 to the another mode. The manual driving mode is an example of another mode.

The control unit 10 may determine that the vibration originated from a collision between the boat 100 and the pier P based on a frequency of the vibration, a time period of the vibration, a time span of the vibration and/or the like. More specifically, the control unit 10 determines that the vibration originated from the collision between the boat 10 and the pier P if the frequency of the vibration is greater than a predetermined frequency. For example, the vibration sensor 40 may detect a vibration of the boat 100 that is originated from a swaying by a wave. However, the vibration originating from the swaying by the wave may have a vibration period of, for example, greater than a second or greater than a few seconds. In comparison, the vibration from the collision between the boat 10 and the pier P may typically have a vibration period that is less than a second, for example, milliseconds to micro seconds (μ~msec). Accordingly, the control unit 10 may determine that the vibration originated from the collision between the boat 10 and the pier P if the frequency (for example, frequency=1/vibration period) of the vibration signal is greater than a predetermined frequency. Conversely, the control unit may determine that the vibration is not originated from the collision between the boat 10 and the pier P if the frequency of the vibration signal is less than the predetermined frequency. The value of the predetermined frequency is not intended to limit the disclosure, and may be set according to requirements.

In another embodiment of the disclosure, the control unit 10 may determine that the vibration originated from the collision between the boat 10 and the pier P if the vibration period of the vibration signal is less than a predetermined period. Conversely, the control unit 10 may determine that the vibration is not originated from the collision between the boat 10 and the pier P if the vibration period of the vibration signal is greater than the predetermined period. The value of the predetermined period is not intended to limit the disclosure, and may be set according to requirements.

Referring to FIG. 3, in an embodiment of the disclosure, when the control unit 10 identifies the first berth BE1 for docking the boat 100, the control unit 10 may further calculate and/or identify GPS position coordinates corresponding to a predetermined area of the first berth BE1. The GPS position coordinates corresponding to the predetermined area of the first berth BE1 may be an example of a predetermined target position specified for automatic docking of the boat 100. If a position (for example, the GPS position coordinates) of the boat 100 is not at the predetermined target position (for example, GPS position coordinates of the first berth BE1) specified for automatic docking, the control unit 10 is configured to not end the automatic docking mode even when the control unit 10 detects the vibration. In this way, the control unit 10 may continue outputting the control signal for controlling an automatic steering of the boat even in the situation when the boat 100 accidently collides with a part of the pier (or for example, another boat) after being swept away by the wind. Furthermore, in this way, the automatic docking mode is ended when the control unit 10 detects the vibration of the boat 100 while the GPS coordinates of the boat 100 is in the GPS coordinates of the first berth BE1.

Figure 4B:
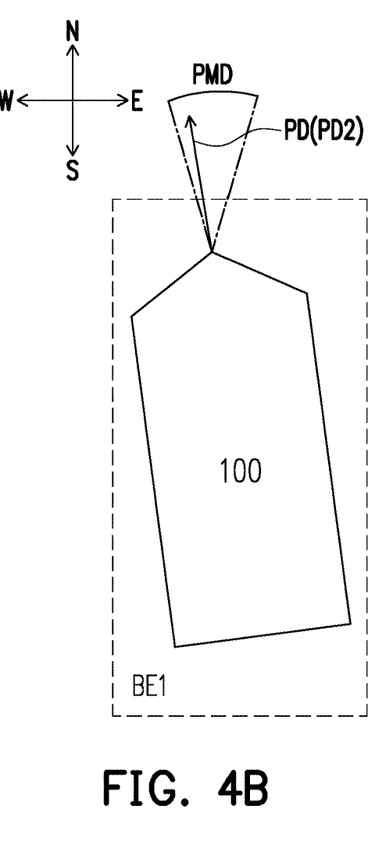
Figure 4C:
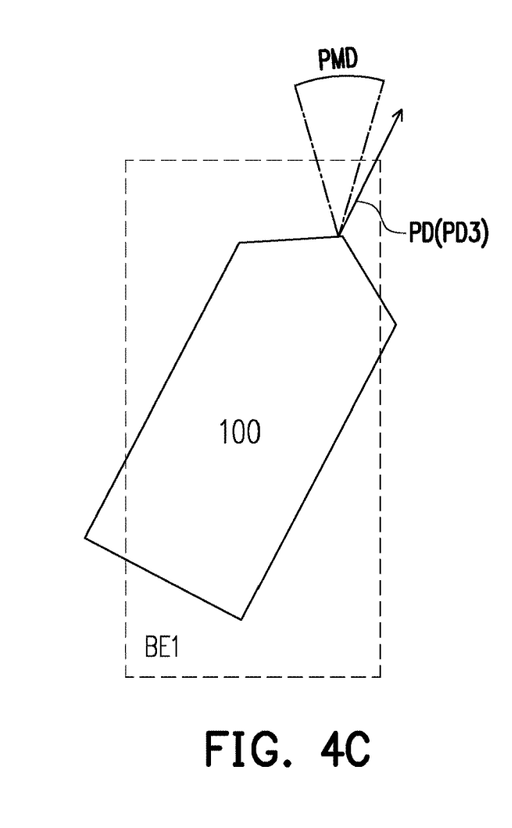

FIG. 4A-4C are schematic diagrams illustrating a comparison between a current pointing direction of a boat and a predetermined mooring direction specified for automatic docking according to an embodiment of the disclosure. Referring to FIG. 4A, the control unit 10 may calculate and/or set a predetermined mooring direction PMD specified for automatic docking of the boat 100 used for automatic docking mode. In the present embodiment, the predetermined mooring direction PMD specified for automatic docking of the boat 100 includes a range of pointing directions. However, the disclosure is not limited thereto. In another embodiment of the disclosure, the predetermined mooring direction PMD specified for automatic docking of the boat 100 may include one pointing direction, for example, due North instead of the range of pointing directions.

Referring to FIG. 4A, a first pointing direction PD1 of the boat 100 is outside of the predetermined mooring direction PMD. Referring to FIG. 4B, a second pointing direction PD2 of the boat 100 is inside of the predetermined mooring direction PMD. Referring to FIG. 4C, a third pointing direction PD3 of the boat 100 is outside of the predetermined mooring direction PMD. As shown in FIGS. 4A and 4C, if a pointing direction PD1, PD3 of the boat 100 is not at a predetermined mooring direction PMD specified for automatic docking, the control unit 10 is configured to not end the automatic docking mode even when the control unit 10 detects the vibration. As shown in FIG. 4B, if a pointing direction PD2 of the boat 100 is the same as, and/or overlaps with the predetermined mooring direction PMD specified for automatic docking, the control unit 10 is configured to end the automatic docking mode when the control unit 10 detects the vibration. In this way, if the pointing direction PD1, PD3 of the boat 100 is not the same as, and/or does not overlap with the predetermined mooring direction PMD specified for automatic docking, the control unit 10 may continue outputting the control signal for controlling an automatic steering of the boat 100 even in the situation when the boat 100 accidently collides with a part of the pier P (or for example, another boat) after being swept away by the wind. In this way, the automatic docking mode is ended when the control unit 10 detects the vibration of the boat 100 while the pointing direction PD2 of the boat 100 coincides with the predetermined mooring direction PMD set by the automatic mooring route MR.

Figure 5:
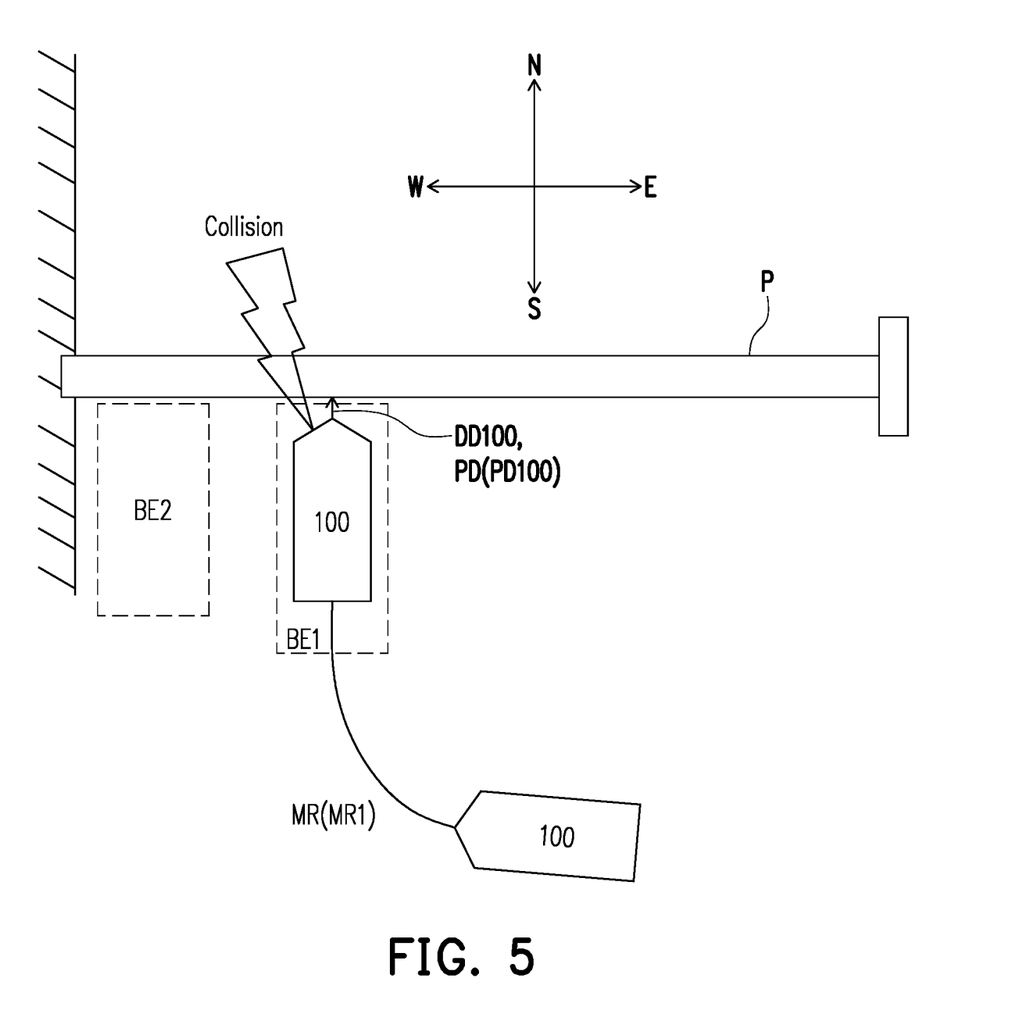
FIG. 5 is a schematic diagram illustrating a first docking direction of the boat based on a first docking route according to an embodiment of the disclosure.

FIG. 5 is a schematic diagram illustrating a first docking direction of the boat based on a first docking route according to an embodiment of the disclosure. Referring to FIG. 5, the control unit 10 calculates and/or sets the automatic mooring route MR1 of the boat 100. That is to say, when the control mode of the control unit 10 is switched to the automatic docking mode via the auto dock switch 60, the control unit 10 automatically steers the boat 10 based on the automatic mooring route MR1 such that the boat 100 may be automatically docked to the pier P via the automatic steering system. Based on the automatic mooring route MR1 set by the automatic docking mode, the control unit 10 determines a docking direction DD100 of the boat 100. The docking direction DD100 is a direction of the boat 100 that is intended to collide with the pier P. The docking direction DD100 of the boat 100 may be specified, for example, as a bow side, a stern side, a port side, a starboard side. In the example of FIG. 5, the docking direction DD100 of the boat 100 is the bow side of the boat 100. In another embodiment of the disclosure, the docking direction DD100 of the boat may be specified, for example, in degrees relative to (degrees from) the pointing direction PD of the boat 10. For example, when the automatic mooring route MR1 requires the bow of the boat 100 to collide with the pier P, then the docking direction DD100 of the boat 100 is 0 degrees from the pointing direction PD100 of the boat 100. That is to say, the pointing direction PD100 of the boat 100 and the docking direction DD100 of the boat 100 are the same direction.

Referring to FIG. 5, the control unit 10 may further determine an input direction of the vibration based on a sensor. That is to say, the control unit 10 may determine the input direction of the vibration based on the vibration sensor 40 and an additional sensor. The additional sensor may be, for example, a camera including an image sensor. For example, the control unit 10 may determine a moving direction of the boat 100 is a forward direction based on the camera. When the control unit 10 detects the vibration while the moving direction of the boat 100 is the forward direction, then the control unit 10 may determine the input direction of the vibration is from the bow side of the boat 100, since the boat 100 is moving in the forward direction when the vibration signal is detected. The control unit 10 is configured to end the automatic docking mode when the input direction of the vibration is a same direction as the docking direction DD100 of the boat 100 set by the automatic mooring route MR1. Namely, since the automatic mooring route MR1 calculated the docking direction DD100 of the boat 100 is the bow side of the boat 100, then the control unit 10 ends the automatic docking mode when the input direction of the vibration is from the bow side of the boat 100.

Figure 6:
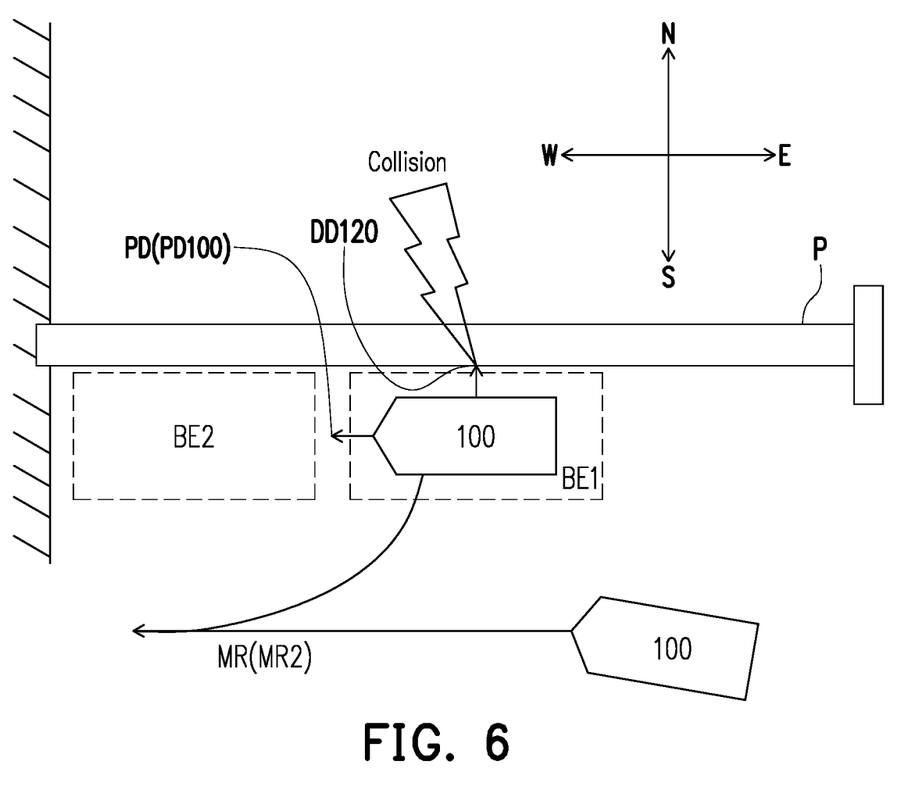
FIG. 6 is a schematic diagram illustrating a second docking direction of the boat based on second docking route according to an embodiment of the disclosure.

FIG. 6 is a schematic diagram illustrating a second docking direction of the boat based on a second docking route according to an embodiment of the disclosure. Referring to FIG. 6, the control unit 10 calculates and/or sets the automatic mooring route MR2 of the boat 100. That is to say, when the control mode of the control unit 10 is switched to the automatic docking mode via the auto dock switch 60, the control unit 10 automatically steers the boat 10 based on the automatic mooring route MR2 such that the boat 100 may be automatically docked to the pier P via the automatic steering system. Based on the automatic mooring route MR2 set by the automatic docking mode, the control unit 10 determines a docking direction DD120 of the boat 100. The docking direction DD120 is a direction of the boat 100 that is intended to collide with the pier P. The docking direction DD100 of the boat 100 may be specified, for example, as a bow side, a stern side, a port side, a starboard side. In the example of FIG. 6, the docking direction DD120 of the boat 100 is the starboard side of the boat 100. In another embodiment of the disclosure, the docking direction DD100 of the boat may be specified, for example, in degrees relative to (degrees from) the pointing direction PD of the boat 10. For example, when the automatic mooring route MR2 requires the starboard side of the boat 100 to collide with the pier P, then the docking direction DD120 of the boat 100 is 90 degrees East from the pointing direction PD100 of the boat 100. That is to say, the docking direction DD120 of the boat 100 is 90 degrees East from the pointing direction PD100 of the boat 100.

Referring to FIG. 6, the control unit 10 may further determine an input direction of the vibration based on a sensor. That is to say, the control unit 10 may determine the input direction of the vibration based on the vibration sensor 40 and an additional sensor. The additional sensor may be, for example, a camera including an image sensor. For example, the control unit 10 may determine a moving direction of the boat 100 is a starboard direction based on the camera. When the control unit 10 detects the vibration while the moving direction of the boat 100 is the starboard direction, then the control unit 10 may determine the input direction of the vibration is from the starboard side of the boat 100, since the boat 100 is moving in the starboard direction when the vibration signal is detected. The control unit 10 is configured to end the automatic docking mode when the input direction of the vibration is a same direction as the docking direction DD120 of the boat 100 set by the automatic mooring route MR1. Namely, since the automatic mooring route MR2 calculated the docking direction DD120 of the boat 100 is the starboard side of the boat 100, then the control unit 10 ends the automatic docking mode when the input direction of the vibration is from the starboard side of the boat 100.

Referring to FIG. 5 and FIG. 6, the control unit 10 determined the input direction of the vibration based on the sensor which is a camera. However, the disclosure is not limited thereto. In another embodiment of the disclosure, the sensor may be the GPS sensor. For example, the GPS sensor may be used for obtaining the moving direction of the boat 100. In another embodiment of the disclosure, the sensor may be another vibration sensor. For example, the boat 100 may include a plurality of vibration sensors 40. An example where the boat 100 include a plurality of vibration sensors 40 is described below.

Figure 7:
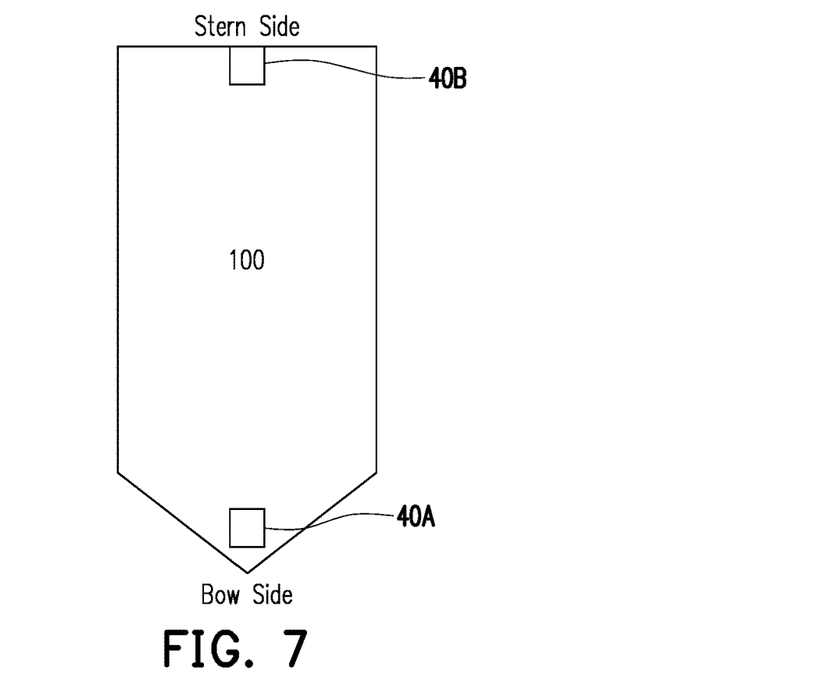
FIG. 7 is a schematic diagram illustrating a detection of a collision direction of a boat based on a first vibration sensor and a second vibration sensor according to an embodiment of the disclosure.

FIG. 7 is a schematic diagram illustrating a detection of a collision direction of a boat based on a first vibration sensor and a second vibration sensor according to an embodiment of the disclosure. FIG. 7 illustrates a top view of the boat 100. Referring to FIG. 7, a first vibration sensor 40A and a second vibration sensor 40B may be disposed on the boat 100. More specifically, the first vibration sensor 40A may be disposed at the bow side of the boat 100, and the second vibration sensor 40B may be disposed at the stern side of the boat 100. The first vibration sensor 40A and the second vibration sensor 40B are coupled to the control unit 10. A number of the vibration sensors is not intended to limit the disclosure. The control unit 10 determines the collision direction of the boat 100 based on a first vibration detected by the first vibration sensor 40A and a second vibration detected by the second vibration sensor 40B. That is to say, a plurality of vibration sensors 40A, 40B detecting the vibration (from the collision between the boat 100 and the pier P) that is exerted on the boat 100, wherein the control unit 10 determines a collision direction of the boat 100 based on a plurality of vibration sensing results.

Referring to FIG. 7, the collision direction of the boat 100 is determined based on a magnitude of the vibration detected by each of the plurality of vibration sensors 40A, 40B. More specifically, the collision direction of the boat 100 is determined based on a magnitude of the first vibration detected by the first vibration sensor 40A and a magnitude of the second vibration detected by the second vibration sensor 40B. The first vibration and the second vibration are the same vibration originating from the same collision, for example, between the boat 100 and the pier P. However, the magnitude of the first vibration may be different from the magnitude of the second vibration. For example, when the bow side of the boat 100 collides with the pier P, then the magnitude of the vibration detected by the first vibration sensor 40A disposed at the bow side of the boat 100 is larger than the magnitude of the vibration detected by the second vibration sensor 40B disposed at the stern side of the boat 100. In another example, when the stern side of the boat 100 collides with the pier P, then the magnitude of the vibration detected by the second vibration sensor 40B disposed at the stern side of the boat 100 is larger than the magnitude of the vibration detected by the first vibration sensor 40A disposed at the bow side of the boat 100. In this way, the collision direction of the boat 100 is determined based on a magnitude of the vibration detected by each of the plurality of vibration sensors 40A, 40B.

Figure 8:
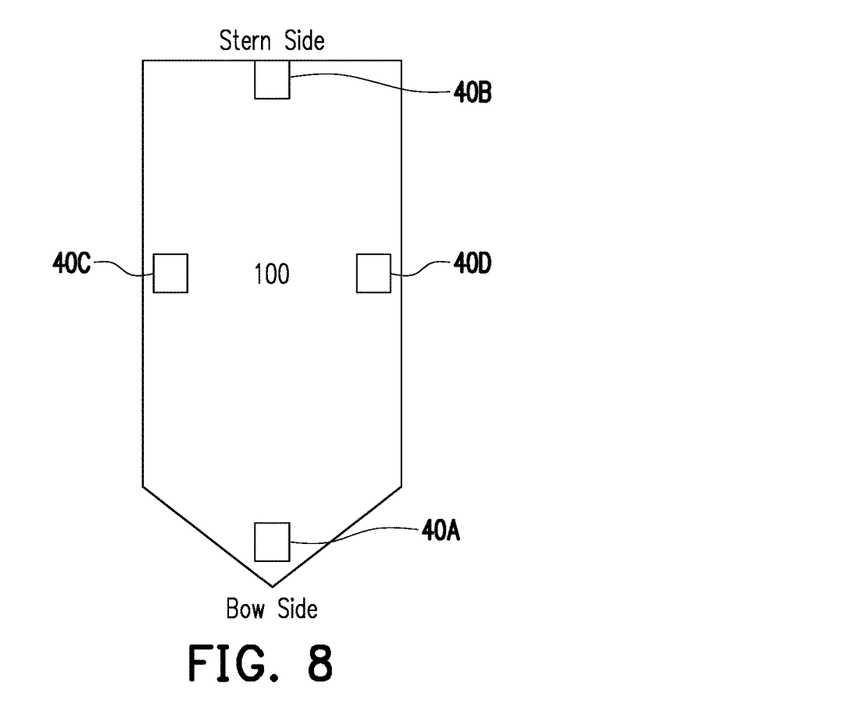
FIG. 8 is a schematic diagram illustrating a detection of a collision direction of a boat based on a plurality of vibration sensors according to an embodiment of the disclosure.

FIG. 8 is a schematic diagram illustrating a detection of a collision direction of a boat based on a plurality of vibration sensors according to an embodiment of the disclosure. FIG. 8 illustrates a top view of the boat 100. Referring to FIG. 8, a first vibration sensor 40A, a second vibration sensor 40B, a third vibration sensor 40C and a fourth vibration sensor 40D may be disposed on the boat 100. More specifically, the first vibration sensor 40A may be disposed at the bow side of the boat 100, the second vibration sensor 40B may be disposed at the stern side of the boat 100, the third vibration sensor 40C may be disposed at the starboard side of the boat 100, and the fourth vibration sensor 40D may be disposed at the port side of the boat 100. The first vibration sensor 40A, the second vibration sensor 40B, the third vibration sensor 40C and the fourth vibration sensor 40D are coupled to the control unit 10. In this way, the collision direction of the boat 100 is determined based on a magnitude of the vibration detected by each of the plurality of vibration sensors 40A, 40B, 40C, 40D. A number of the vibration sensors is not intended to limit the disclosure. Furthermore, the vibration sensors may be disposed at other parts of the boat 100 and are not limited hereto. For example, the second vibration sensor 40B may be disposed at the motor of the boat 100. In another embodiment of the disclosure, the second vibration sensor 40B may be omitted, and the boat 100 includes the vibration sensors 40A, 40C, 40D.

Furthermore, the system of FIG. 1 may include a filter for filtering the vibrations detected by the vibration sensor 40. For example, the filter may be configured to remove unwanted vibration from the surrounding such as, for example, vibration from the motor, the vibration from the sway of the wave, and/or the like.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A system, adapted to determine that automatic docking of a boat is completed, the system comprising:
   a control unit, comprising a processor, configured to:
   switch a control mode of the control unit to an automatic docking mode;
   output a control signal for controlling an automatic steering of the boat when the control mode is switched to the automatic docking mode;
   obtain a vibration that is exerted on the boat;
   wherein, when the control unit is in the automatic docking mode, the control unit is configured to end the automatic docking mode when the control unit detects the vibration.

2. The system according to claim 1, wherein the control unit is configured to end the automatic docking mode by stopping the output of the control signal for controlling the automatic steering of the boat.

3. The system according to claim 1, wherein
   if a position of the boat is not at a predetermined target position specified for automatic docking, the control unit is configured to not end the automatic docking mode even when the control unit detects the vibration.

4. The system according to claim 1, wherein
   if a pointing direction of the boat is not at a predetermined pointing direction specified for automatic docking, the control unit is configured to not end the automatic docking mode even when the control unit detects the vibration.

5. The system according to claim 1, wherein the control unit determines that the vibration originated from a collision between the boat and a dock based on a frequency of the vibration.

6. The system according to claim 5, wherein the control unit determines that the vibration originated from the collision between the boat and the dock if the frequency of the vibration is greater than a predetermined frequency.

7. The system according to claim 1, wherein the control unit determines a docking direction of the boat based on a docking route set by the automatic docking mode, the docking direction is a direction from the boat towards a dock,
   the control unit determines an input direction of the vibration based on a sensor,
   the control unit is configured to end the automatic docking mode when the input direction of the vibration is a same direction as the docking direction of the boat.

8. The system according to claim 1, further comprising:
   a vibration sensor detecting the vibration that is exerted on the boat.

9. The system according to claim 1, further comprising:
   a plurality of vibration sensors detecting the vibration that is exerted on the boat,
   wherein the control unit determines a collision direction of the boat based on a plurality of vibration sensing results.

10. The system according to claim 9, wherein the collision direction of the boat is determined based on a magnitude of the vibration detected by each of the plurality of vibration sensors.

11. The system according to claim 10, wherein the plurality of vibration sensors includes a first vibration sensor, a second vibration sensor and a third vibration sensor,
    the first vibration sensor is disposed at a bow side of the boat,
    the second vibration sensor is disposed at a port side of the boat,
    the third vibration sensor is disposed at a starboard side of the boat.

* * * * *